(12) United States Patent
Ogata

(10) Patent No.: US 7,239,603 B1
(45) Date of Patent: Jul. 3, 2007

(54) RECORDING MEDIUM WITH JUDGING AREA FOR TRACK AREA IDENTIFICATION BASED ON WOBBLING POLARITY

(75) Inventor: Nobuo Ogata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 586 days.

(21) Appl. No.: 09/590,221

(22) Filed: Jun. 8, 2000

(30) Foreign Application Priority Data

Jun. 9, 1999 (JP) ................. 11-163135

(51) Int. Cl.
*G11B 7/09* (2006.01)
*G11B 21/08* (2006.01)

(52) U.S. Cl. .................. 369/275.4; 369/53.34
(58) Field of Classification Search ............. 369/275.3, 369/275.4, 275.1, 44.13, 44.23, 44.16, 44.26, 369/277, 278, 47, 53.29, 47.28, 59.23, 59.25, 369/53.34, 47.21, 47.31
See application file for complete search history.

(56) References Cited

U.S. PATENT DOCUMENTS

| 5,844,883 | A | * | 12/1998 | Kanno et al. ................ 369/277 |
| 5,852,599 | A | * | 12/1998 | Fuji ........................ 369/275.4 |
| 5,909,412 | A | * | 6/1999 | Nakayama et al. ....... 369/44.13 |
| 5,940,364 | A | * | 8/1999 | Ogata et al. ............. 369/275.4 |
| 6,181,658 | B1 | * | 1/2001 | Van Den Enden et al. ........................ 369/59.25 |
| 6,292,458 | B1 | * | 9/2001 | Eguchi et al. ........... 369/275.3 |
| 6,526,007 | B1 | * | 2/2003 | Fujita ...................... 369/53.19 |

FOREIGN PATENT DOCUMENTS

| JP | 08-321045 | 12/1996 |
| JP | 09-259441 | 10/1997 |
| JP | 9-259441 | 10/1997 |
| JP | 10-40549 | 2/1998 |
| JP | 10-040549 | 2/1998 |
| JP | 10-074321 | 3/1998 |
| JP | 10-162369 | 6/1998 |
| JP | 10-302263 | 11/1998 |
| JP | 10-302338 | 11/1998 |
| JP | 10-312543 | 11/1998 |
| JP | 10-320784 | 12/1998 |
| JP | 10-334530 | 12/1998 |
| JP | 11-149650 | 6/1999 |
| JP | 11-219531 | 8/1999 |

* cited by examiner

*Primary Examiner*—Andrea Wellington
*Assistant Examiner*—Kim-Kwok Chu
(74) *Attorney, Agent, or Firm*—Peter J. Manus; David G. Conlin; Edwards Angell Palmer & Dodge LLP

(57) ABSTRACT

A recording and reproducing apparatus of the present invention includes a photo-detector having light receiving sections divided along the track direction of an optical disk. The apparatus also includes a wobble signal processing circuit for generating a wobbling polarity judging signal used in judging a wobbling polarity of a track being tracked by comparing phases of a first wobble signal detected from a difference signal of the outputs of the light receiving sections and a second wobble signal detected from a sum signal of the outputs of the light receiving signals. Consequently, whether the wobbled side wall of the track being tracked is the inner or outer radius of track can be judged in real time by a simple structure using one laser beam.

6 Claims, 12 Drawing Sheets

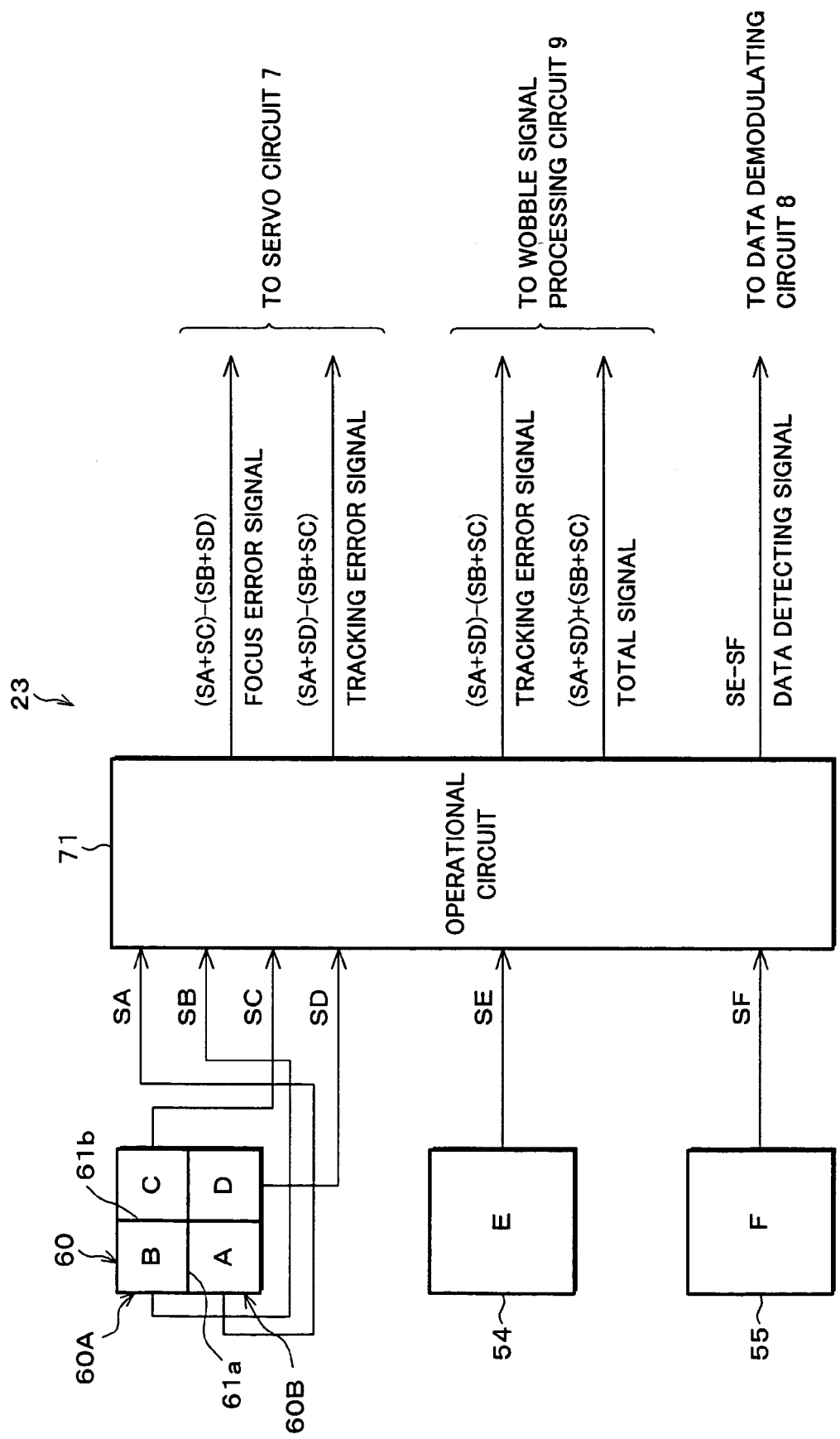

PRIOR ART

RECORDING MEDIUM WITH JUDGING AREA FOR TRACK AREA IDENTIFICATION BASED ON WOBBLING POLARITY

FIELD OF THE INVENTION

The present invention relates to a recording and reproducing apparatus capable of judging whether a wobbled side wall of a track in a one side wobble optical disk is at an inner or outer radius of the track by means of polarity judgment, and to a recording medium employed in such a recording and reproducing apparatus.

BACKGROUND OF THE INVENTION

With a widespread use of a so-called multimedia technique in recent years, a huge volume of data including digital still images, motion pictures, etc. have been handled. Such a huge volume of data is stored in a recording medium of a large capacity, such as an optical disk, and reproduced as necessary by means of random access. The optical disk has a merit that it can provide random access and a higher recording density than that of a magnetic recording medium, such as a floppy disk.

Further, some kinds of optical disks, such as a magneto-optical disk, are erasable (overwritable) and used extensively as recording media in handling a huge volume of data including digital still images and motion pictures, etc.

Most of the magneto-optical disks are provided with pits and projections on its recording layer, which are referred to as grooves and lands and used as tracking guides.

The pits and projections are also used to create address information of the track beforehand. In other words, a carrier of a specific frequency is modulated by a cluster number or a sector number indicating a position on the recording medium, and the projection forming the grooves is wobbled in accordance with this modulation signal in advance, so that the shape (wobbled shape) of the side wall of the grooves thus formed indicates address information of the track.

In order to record an increased volume of data into the recording medium, such as an optical disk and a magneto-optical disk, data is recorded at a high density by, for example, giving a narrower track pitch and thereby increasing a linear density in the track direction.

The following will explain an example optical disk disclosed in Japanese Laid-open Patent Application No. 259441/1997 (Japanese Official Gazette, Tokukaihei No. 9-259441, publishing date: Oct. 3, 1997) (hereinafter, referred to as Document 1) with reference to FIGS. 11 and 12.

As shown in FIG. 11, an optical disk 110 is provided with a wobbling groove G1 indicated by a broken line with both side walls being wobbled and thereby creating address information beforehand and a non-wobbled DC groove G2 indicated by a solid line, which are independent continuous spirals heading from the inner radius to the outer radius of the optical disk 110.

In other words, the optical disk 110 is provided with the wobbling groove G1 and DC groove G2 aligned alternately along the radius direction, and as shown in FIG. 12, information is recorded into lands L1 and L2 formed between the wobbling groove G1 and DC groove G2.

The wobbling groove G1 and DC groove G2 are aligned alternately per rotation, which means two-track pitch is secured between the adjacent wobbling grooves G1. This arrangement can suppress crosstalk (interference from the side wall of the other tracks) caused when reading the address information from the side wall of the wobbling groove G1.

In addition, because the wobbling groove G1 or DC groove G2 is provided between the adjacent lands L1 and L2, crosserase can be also suppressed. In this manner, a recording medium having a narrower track pitch and hence a higher recording density can be realized.

Incidentally, the address information of a particular track, for example, the address information of the lands L1 and L2 of FIG. 12 is formed as the shape of the wobbling groove G1 provided at the inner or outer radius of the lands L1 and L2. In other words, the land L1 at the inner radius of the wobbling groove G1 and the land L2 at the outer radius of the wobbling groove G1 share the address information.

Hence, when information is recorded/reproduced into/from the optical disk 110, it is necessary to conduct track area judgment (wobbling polarity judgment), by which whether the address information of an area being tracked is the one for a first track area (land L1) at the outer radius of the wobbling groove G1 or a second track area (land L2) at the inner radius of the wobbling groove G1 is judged.

In case that three laser beams (a main beam used in recording/reproducing data and two sub-beams used in detecting a tracking error) are used, the track area judgment is generally conducted by using reflection light of the two sub-beams. For example, as shown in FIG. 12, a main beam MB1 is irradiated at the center of the first track area (land L1), while a first sub-beam SB1 is irradiated at the center of the wobbling groove G1 at the inner radius of the land L1 and a second sub-beam SB2 is irradiated at the center of the DC groove G2, and a tracking error signal is detected by means of the DPP (Differential Push Pull) technique. Then, the track area judgment (wobbling polarity judgment) is conducted by comparing a wobble signal obtained from reflection light of the first sub-beam SB1 with a wobble signal obtained from reflection light of the second sub-beam SB2.

Here, as shown in FIG. 12, in case that the first sub-beam SB1 preceding the main beam MB1 is irradiated at the inner radius and the second sub-beam SB2 following the main beam MB1 is irradiated at the outer radius, if the wobble signal obtained from the first sub-beam SB1 is greater than the one obtained from the second sub-beam SB2, then it is judged that the wobbling groove G1 is at the inner radius of the disk in comparison with the main beam MB1, and therefore, the area being tracked is the first track area (land L1) at the outer radius of the wobbling groove G1.

However, this technique demands three laser beams, and has a problem that it can not be realized by using an optical pick-up emitting only one laser beam.

In addition, because the wobble signal obtained from the first sub-beam SB1 is compared with the one obtained from the second sub-beam SB2 in largeness, the positional relation among the first sub-beam SB1 and second sub-beam SB2 and the track has to be set precisely.

Further, when using three laser beams, the irradiation intensity of the first sub-beam SB1 and second sub-beam SB2 has to be set to approximately 10% of the irradiation intensity of the main beam MB1, so that the first sub-beam SB1 and second sub-beam SB2 will not erase recorded data when recording a signal. This lowers an S/N ratio of output signals obtained from the first sub-beam SB1 and second sub-beam SB2, thereby causing a problem that an error readily occurs in the track area judgment.

In order to solve this problem, Document 1 discloses a technique, by which the track area judgment is conducted not by using three laser beams but only one laser beam. For example, according to this publication, one laser beam is irradiated at the position to which the main beam MB1 is irradiated in FIG. 12, and, in the detecting optical system, reflection light of the main beam MB1 is detected by a photo-detector divided into two sections by a dividing line along the track direction. Then, the track area judgment is conducted by comparing a wobble signal detected from the inner half-round area with a wobble signal detected from the outer half-round area.

Also, Japanese Laid-open Patent Application No. 40549/1998 (Japanese Official Gazette, Tokukaihei No. 10-40549, publishing date: Feb. 13, 1998) (hereinafter, referred to as Document 2) discloses a technique using only one laser beam, by which the track area judgment is conducted by comparing a wobble signal obtained when detracking a track toward the inner radius and a wobble signal obtained when detracking a track toward the outer radius.

However, the technique disclosed in Document 1 has a problem that a correspondence of the light receiving sections to a detection area inverts depending on whether the photo-detector is placed before or after a focal point of the detecting optical system.

In addition, because each apparatus is different from the others, a difference should be corrected by replacing wiring or changing switch setting, thereby causing a problematic increase in the manufacturing costs.

Further, given $\lambda$ as a wavelength of a light source used for an optical head of the recording and reproducing apparatus, then the large-and-small relation of the wobble signals inverts depending on whether the depth of the groove of the recording medium is greater or smaller than $\lambda/4$. This problematically limits the depth of the groove of a used recording medium.

Also, according to the technique disclosed in Document 2, the track area judgment is conducted after the wobble signals are measured at least in two tracking states, which makes a real-time judgment impossible. Thus, in case that the first and second track areas are wobbled by the common address information, even if an unwanted track jump occurs, it can not be detected from the address information. Therefore, there rises a problem that when a signal is recorded, recorded data is broken, and when a signal is reproduced, data can not be reproduced continuously.

SUMMARY OF THE INVENTION

The present invention is devised to solve the above problems, and therefore, has an object to provide (1) a recording and reproducing apparatus which can judge in real time whether a wobbled side wall of a track being tracked is at the inner or outer radius of the track by employing a simple structure using one laser beam, and set a correspondence of the wobbling polarity to a track area independently of a depth of the grooves provided in the recording medium, and (2) a recording medium employed in such a recording and reproducing apparatus.

In order to fulfill the above and other objects, a recording and reproducing apparatus of the present invention is a recording and reproducing apparatus for recording/reproducing information into/from a recording medium provided with a first track area where one side wall is wobbled and a second track area where the other side wall at a non-wobbled side in the first track is wobbled, comprising:

a photo-detector, having at least two light receiving sections divided along a track direction, for receiving reflection light from a track by each of the two light receiving sections;

a first wobble signal detecting circuit for detecting a first wobble signal from a difference signal of outputs from the two light receiving sections of the photo-detector;

a second wobble signal detecting circuit for detecting a second wobble signal from a sum signal of the outputs from the two light receiving sections of the photo-detector; and a wobbling polarity judging signal generating section for generating a wobbling polarity judging signal used in judging a wobbling polarity of a track being tracked by comparing phases of the first and second wobble signals detected.

According to the above-arranged recording and reproducing apparatus, the wobbling polarity judging signal generating circuit generates the wobbling polarity judging signal used in judging the wobbling polarity of a track being tracked by comparing the phases of the first and second wobble signals detected separately from reflection light from the track. Thus, the wobbling polarity of the track can be judged at high accuracy in real time by using one laser beam.

Hence, by providing a track area judging circuit for judging whether a track area being tracked is a first track area or a second track area in accordance with the wobbling polarity judging signal generated by the wobbling polarity judging signal generating circuit, the track area can be judged in real time.

Because the track area is judged in real time based on the wobbling polarity, even if an unwanted track jump occurs in a recording medium in which common address information is wobbled in the first and second track areas, a signal can be recorded/reproduced continuously into/from a track area which had been controlled right before the track jump occurred.

Consequently, even if an unwanted track jump occurs, a signal can be recorded into a recording medium without breaking recorded data and data can be reproduced continuously when reproducing recorded signals from the recording medium.

In order to fulfill the above and other objects, a recording medium of the present invention is a recording medium provided with a first track area where one side wall is wobbled and a second track area where the other side wall at a non-wobbled side in the first track is wobbled, in which an adjusting area indicating a correspondence of a wobbling polarity to a track area is formed.

According to the above arrangement, by providing the adjusting area showing a correspondence of the wobbling polarity to the track area to the recording medium, the correspondence of the wobbling polarity to the track area can be initialized for each recording medium, thereby making it possible to set a new correspondence of the wobbling polarity to the track area. Consequently, a reference recording medium used in adjusting the correspondence of the wobbling polarity to the track area can be omitted.

Thus, by setting a correspondence of the wobbling polarity to the track area in each recording medium, a respective correspondence can be set for each of the recording media of two kinds having opposite phase relation between the first and second wobble signals having different depths of the grooves. Thus, the limitation of the depth of the groove in a used recording medium can be removed.

For a fuller understanding of the nature and advantages of the invention, reference should be made to the ensuing detailed description taken in conjunction with the accompanying drawings.

BRIEF DESCRIPTION OF THE DRAWINGS

FIG. 6 is a view schematically showing an arrangement of an example signal processing section provided in the recording/reproducing section of FIG. 3;

DESCRIPTION OF EMBODIMENTS

The following description will describe one embodiment of the present invention.

Before a recording and reproducing apparatus of the present invention will be explained, a recording medium employed by the recording and reproducing apparatus will be explained.

Figure 11:
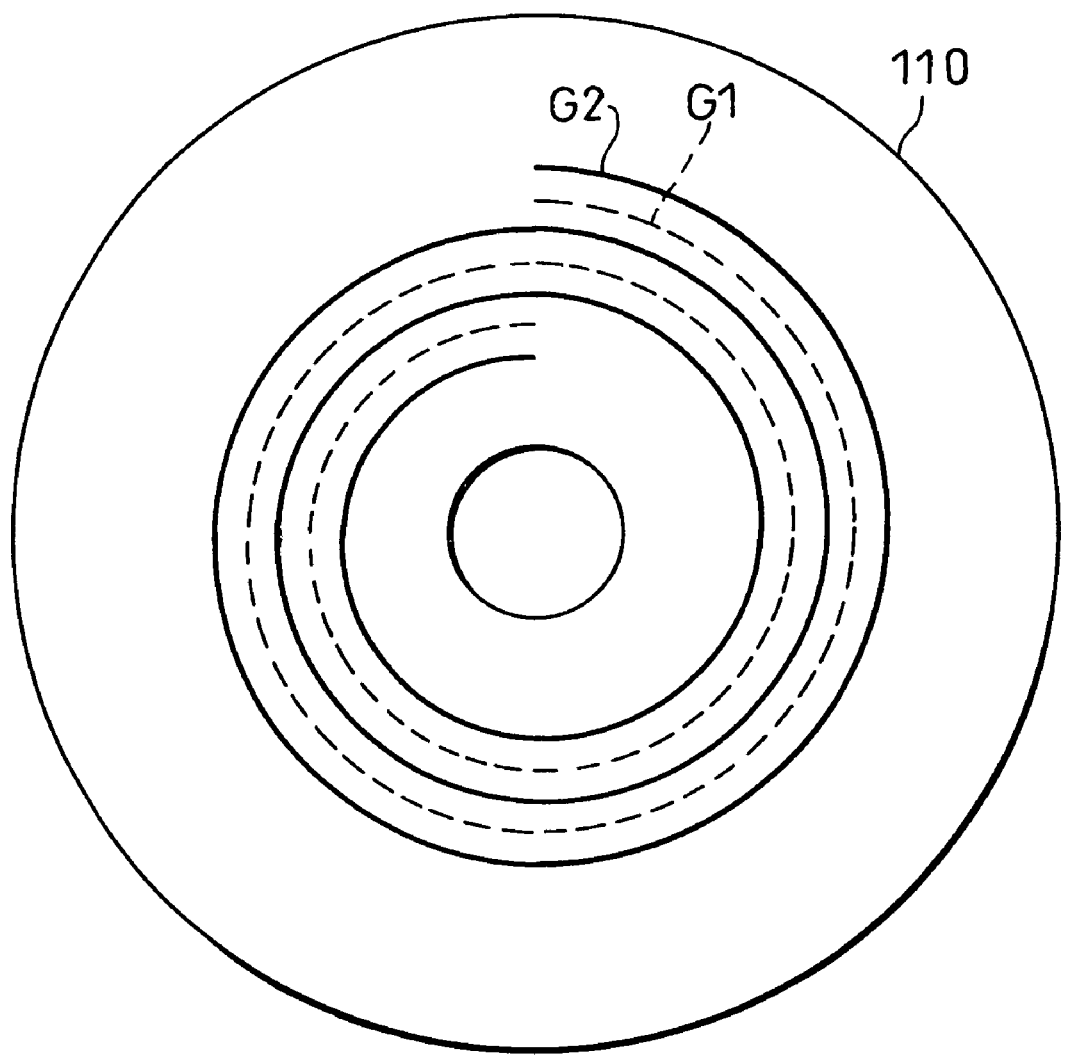
FIG. 11 is a view schematically showing an example optical disk as a recording medium.

Used as the recording medium herein is an optical disk 10 (FIG. 2), which is, like the foregoing optical disk 110 of the prior art in FIG. 11, provided with a wobbling groove G1 with both side walls being wobbled and thereby creating address information beforehand, and a non-wobbled DC groove G2, which are independent continuous spirals heading from the inner radius to the outer radius of the optical disk 10.

Figure 12:
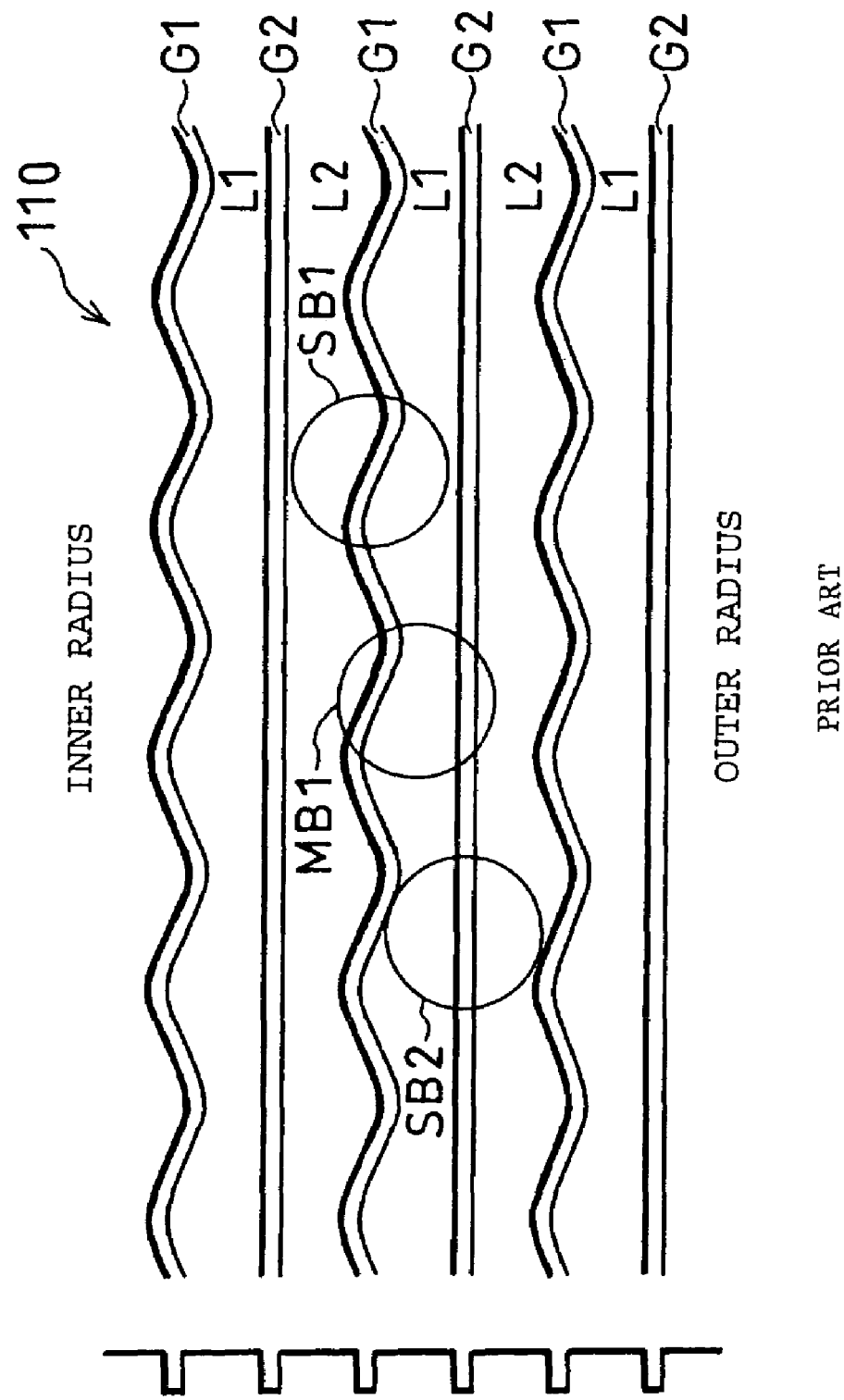
FIG. 12 is a view explaining an example of a principle in judging a wobbling polarity by a conventional recording and reproducing apparatus.

In other words, as shown in FIG. 12, the optical disk 10 is provided with the wobbling groove G1 and DC groove G2 aligned alternately along the radius direction, and information is recorded and reproduced into/from lands L1 and L2 provided between the wobbling groove G1 and DC groove G2.

Incidentally, the address information of the tracks (lands L1 and L2) on the optical disk 10 is created beforehand as the shape of the wobbling groove G1 at the inner or outer radius of the tracks, and the address information is shared by the track (land L1) at the outer radius of the wobbling groove G1 and the track (land L2) at the inner radius of the wobbling groove G1.

Thus, when information is recorded/reproduced into/from the optical disk 10, it is necessary to judge the address information by means of track area judgment (wobbling polarity judgment) so as to judge whether the track in question is on the land L1 (first track area) at the outer radius of the wobbling groove G1 or on the land L2 (second track area) at the inner radius of the wobbling groove G1.

The recording and reproducing apparatus of the present invention conducts the track area judgment of the optical disk 10 in real time by a simple structure using one laser beam. The following will explain one embodiment of the recording and reproducing apparatus of the present invention.

Figure 2:
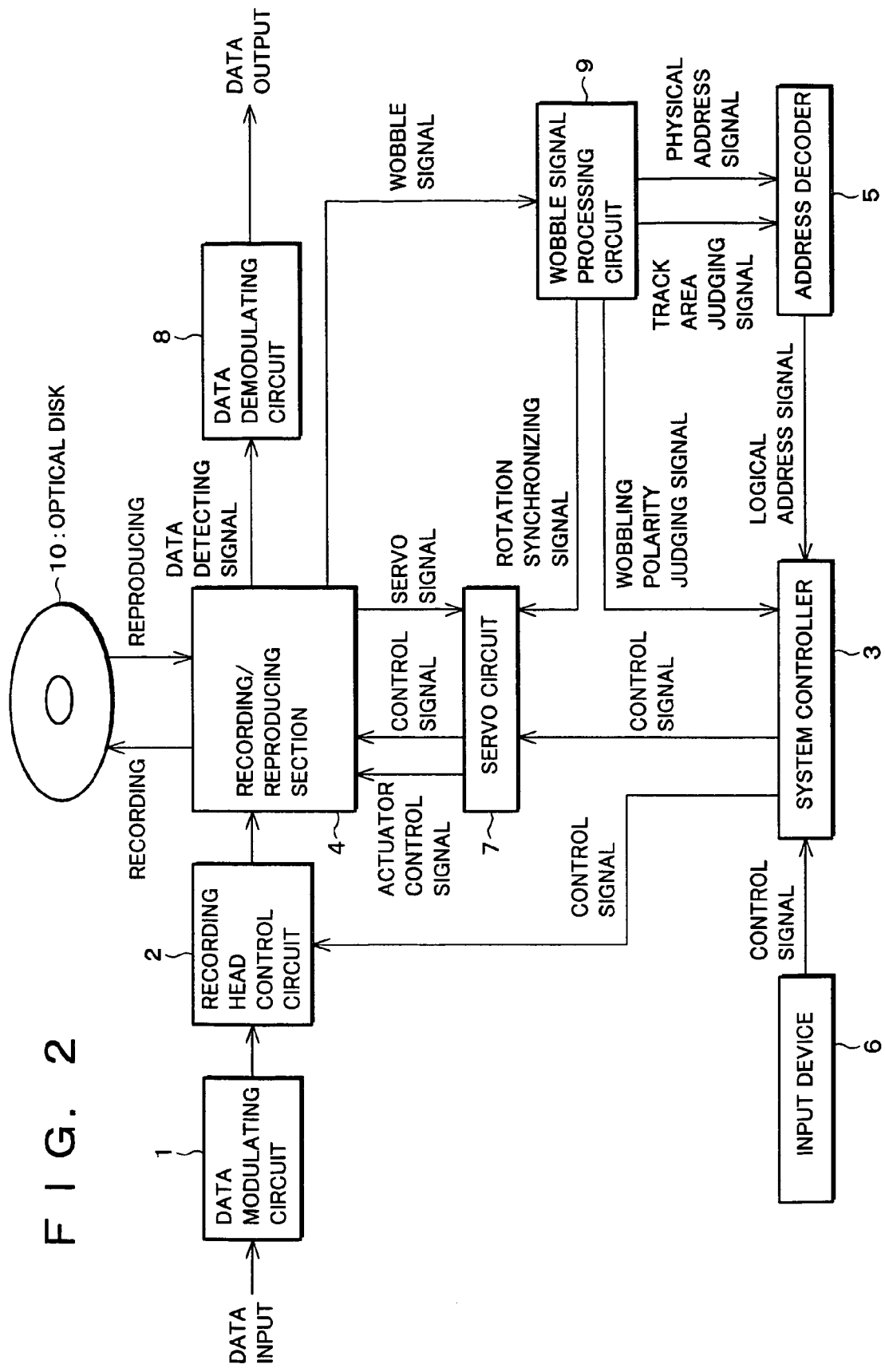
FIG. 2 is a view schematically showing an arrangement of the entire recording and reproducing apparatus of FIG. 1.

As shown in FIG. 2, the recording and reproducing apparatus of the present embodiment includes a data modulating circuit 1, a recording head control circuit 2, a system controller 3, a recording/reproducing section 4, an address decoder 5, an input device 6, a servo circuit 7, a data demodulating circuit 8, and a wobble signal processing circuit 9, and records and reproduces information (data) into/from the optical disk 10 used as a recording medium.

The data modulating circuit 1 converts input data of a specific kind into codes of a particular recording format compatible to the optical disk 10, and outputs the same to the recording head control circuit 2.

The recording head control circuit 2 generates a control signal for controlling operations of a recording/reproducing head 21 (FIG. 3) in the recording/reproducing section 4 described below in accordance with the codes supplied from the data modulating circuit 1, and outputs the same to the recording/reproducing section 4. In other words, the recording head control circuit 2 controls the operation of the recording/reproducing section 4 to record the codes supplied from the data modulating circuit 1 into the optical disk 10.

The recording/reproducing section 4 not only records the codes supplied from the data modulating circuit 1 into the recording medium 10 as has been discussed, but also reads and reproduces recorded data from the optical medium 10 by emitting a laser beam to the optical disk 10 and receiving reflection light.

The recording/reproducing section 4 outputs readout data from the optical disk 10 to the data demodulating circuit 8 described below, and generates a servo signal (tracking error signal, focus error signal) and a wobble signal (address information, rotation synchronizing information) from received reflection light, and outputs the former to the servo circuit 7 described below, and the latter to the wobble signal processing circuit 9 described below.

The recording/reproducing section 4 includes a photo-detector having at least two light receiving sections divided along the track direction of the optical disk 10, and outputs a first wobble signal generated from a difference signal (tracking error signal) of the two light receiving sections and a second wobble signal generated from a sum signal (total signal) of the two light receiving sections to the wobble signal processing circuit 9 as the wobble signal.

The wobble signal processing circuit 9 judges whether a track in the optical disk 10 into/from which information is currently recorded/reproduced is the land L1 (first track area) at the outer radius of the wobbling group G1 or the land L2 (second track area) at the inner radius of the wobbling group G1 by using the first and second wobble signals supplied from the recording/reproducing section 4, and generates a wobbling polarity judging signal, a track area judging signal, and a physical address signal.

The wobble signal processing circuit 9 outputs the generated wobbling polarity judging signal to the system controller 3, and the track area judging signal and physical address signal to the address decoder 5.

Also, the wobble signal processing circuit 9 extracts a rotation synchronizing signal from the wobble signal including two kinds of wobble signals supplied from the recording/reproducing section 4, and outputs the same to the servo circuit 7. The wobble signal processing circuit 9 will be described in detail below.

The address decoder 5 computes a logical address (address assigned uniquely to the track) from the physical address signal and track area judging signal supplied from the wobble signal processing circuit 9, and outputs the same to the system controller 3 as a logical address signal.

The system controller 3 outputs a specific control signal to the servo circuit 7 based on the logical address signal supplied from the address decoder 5. Also, upon supply of a signal for a particular manipulation (manipulation related to information recording/reproducing) from the input device 6, such as a manipulation panel, the system controller 3 outputs a control signal based on the received signal to the servo circuit 7.

The system controller 3 outputs a control signal (start or stop of the recording, etc.) related to data recording to the recording head control circuit 2 based on the logical address signal supplied from the address decoder 5.

Further, upon detection of an abnormal inversion of the wobbling polarity by the wobbling polarity judging signal supplied from the wobble signal processing circuit 9, the system controller 3 outputs a control signal directing to suspend the recording to the recording head control circuit 2 when information is recorded into the optical disk 10, or directing to suspend and resume (re-access) the reproducing to the servo circuit 7 when information is reproduced from the optical disk 10.

The foregoing output of the control signals by the system controller 3 is conducted without involving address computation processing, and for this reason, even if an abnormal track jump occurs, a countermeasure can be taken instantaneously. Hence, the system controller 3 is furnished with a function as recording/reproducing control means.

The following will explain when the system controller 3 functions as the recording/reproducing control means and judges the occurrence of an unwanted track jump from an abnormal inversion of the wobbling polarity. The abnormal inversion of the wobbling polarity means a condition under which the wobbling polarity inverts by an unwanted track jump. Such an unwanted track jump occurs due to a defect of the optical disk or an impact applied to the recording and reproducing apparatus.

Incidentally, there are two typical track access methods when recording/reproducing information into/from the optical disk 10.

The first track access method is an access method, by which the first track area (land L1) is accessed from the inner radius to the outer radius, and then the second track area (land L2) is accessed from the inner radius to the outer radius.

The second track access method is an access method, by which the first track area (land L1) and second track area (land L2) are accessed alternately from the inner radius to the outer radius by intentionally causing a track jump for each rotation of the optical disk 10.

The following will explain the judgment process of the occurrent of an unwanted track jump in regard to the foregoing two track access methods.

In case of the first track access method, the wobbling polarity does not invert unless the track area is switched in a normal access state where information is recorded or reproduced continuously. Thus, an abnormal inversion can be detected instantaneously upon detection of inversion of the wobbling polarity. In this case, because the wobbling polarity judging signal generated by the wobble signal processing circuit 9 is a signal that shows inversion of the wobbling polarity, the system controller 3 judges the inversion of the wobbling polarity thus indicated as abnormal inversion.

Thus, even if an unwanted track jump is not detected by the tracking error signal, the occurrence of an unwanted track jump can be judged from the inversion of the wobbling polarity.

In case of the second track access method, the wobbling polarity inverts each time the optical disk 10 rotates once in the normal access state where information is reproduced or recorded continuously. Thus, an abnormal inversion of the wobbling polarity can be judged upon detection of an irregular polarity inversion (different from a predetermined polarity inversion). In this case, the wobbling polarity judging signal generated by the wobble signal processing circuit 9 is a signal that shows an irregular polarity inversion. Thus, the system controller 3 can judge the inversion of the wobbling polarity thus indicated as abnormal inversion instantaneously.

Hence, in this case, even if an unwanted track jump can not be detected by a tracking error signal, the occurrence of an unwanted track jump can be judged from the inversion of the wobbling polarity.

As has been discussed, the system controller 3 judges the occurrence of an unwanted track jump if the wobbling polarity judging signal generated by the wobble signal processing circuit 9 is a signal that shows irregular inversion of the wobbling polarity for an intended track jump, that is, a signal indicating an abnormal inversion of the wobbling polarity.

Thus, the system controller 3 judges the occurrence of an unwanted track jump from the wobbling polarity judging signal, and outputs the foregoing control signal to the servo circuit 7 to control the recording/reproducing action.

The servo circuit 7 generates an actuator control signal which controls the operation of an actuator provided to the recording/reproducing section 4 based on the servo signal (focus error signal, tracking error signal) supplied from the recording/reproducing section 4, and outputs the same to the recording/reproducing section 4. Here, by controlling the action of the actuator by means of the recording/reproducing section 4 based on the actuator control signal supplied from the servo circuit 7, the focus state and tracking state of a light spot on the optical disk 10 can be adjusted.

In addition, the servo circuit 7 controls a spindle motor in the recording/reproducing section 4 based on the rotation synchronizing signal from the wobble signal processing circuit 9, and turns the optical disk 10 at a specific rate. On the other hand, the servo circuit 7 generates a control signal controlling the recording/reproducing action of the recording/reproducing section 4 based on the control signal from the system controller 3, and outputs the same to the recording/reproducing section 4.

The recording/reproducing section 4 outputs data reproduced from the optical disk 10 to the data demodulating circuit 8 as a data detecting signal. In other words, the data demodulating circuit 8 demodulates data read out from the optical disk 10 by the recording/reproducing section 4, and outputs demodulated data to unillustrated data output means, such as a speaker.

Generally, the data demodulating circuit 8 is connected to the data output means through a buffer memory so as to reproduce information continuously even if an abnormal track jump occurs. A storage capacity of the buffer memory provided in the data demodulating circuit 8 can be small, because it takes only a short time to control the reading/reproducing action by the recording and reproducing apparatus of the present embodiment.

Next, the following will provide detailed explanation of the wobble signal processing circuit 9.

As has been discussed, the wobble signal processing circuit 9 receives the first and second wobble signals generated by the recording/reproducing section 4, and generates the rotation synchronizing signal, physical address signal, wobbling polarity judging signal, and track area judging signal based on these first and second wobble signals.

In the first place, a brief explanation of how the first and second wobble signals are generated by the recording/reproducing section 4 will be given.

Figure 1:
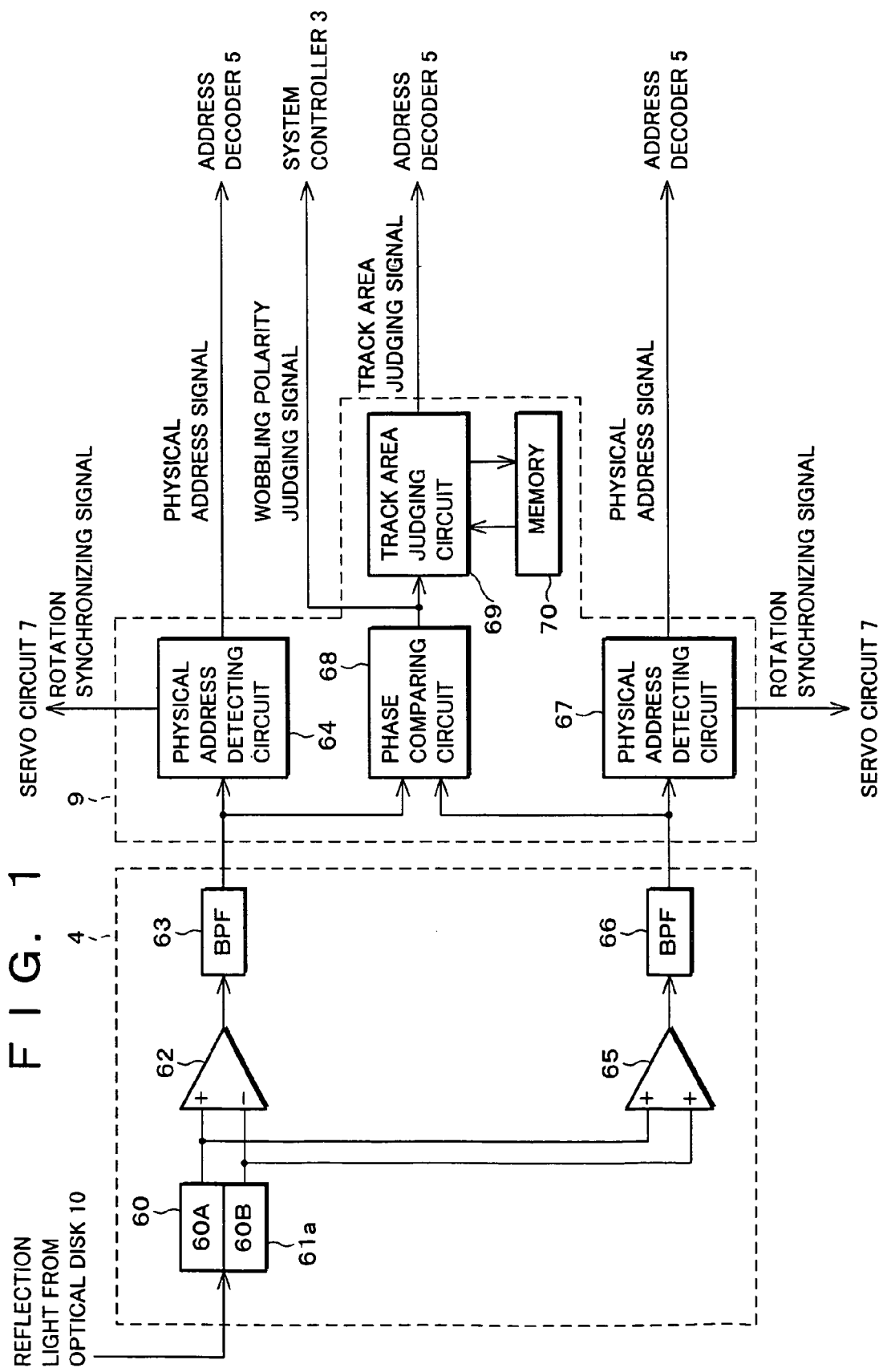
FIG. 1 is a view schematically showing an arrangement of a major portion of a recording and reproducing apparatus of the present invention.

As shown in FIG. 1, the recording/reproducing section 4 is provided with a photo-detector 60 for receiving reflected light from the optical disk 10. The photo-detector 60 is composed of two light receiving sections 60A and 60B divided by a dividing line 61*a* along the track direction (direction parallel to the track) of the optical disk 10.

The outputs of the light receiving sections 60A and 60B are connected to both a differential amplifier 62 and an adder amplifier 65.

A wobbling component is extracted from a difference signal (tracking error signal) outputted from the differential amplifier 62 by a band-pass filter (BPF) 63, and inputted as the first wobble signal to a physical address detecting circuit 64 and a phase comparing circuit 68 provided in the wobble signal processing circuit 9. In other words, the differential amplifier 62 and band-pass filter 63 constitute first wobble signal detecting means.

On the other hand, a wobbling component is extracted from a sum signal (total signal) outputted from the adder amplifier 65 by a band-pass filter (BPF) 66, and inputted as the second wobble signal to a physical address detecting circuit 67 and the phase comparing circuit 68 provided in the wobble signal processing circuit 9. In other words, the adder amplifier 65 and band-pass filter 66 constitute second wobble signal detecting means.

Next, the following will explain the wobble signal processing circuit 9.

The wobble signal processing circuit 9 includes the physical address detecting circuits 64 and 67, phase comparing circuit (wobbling polarity judging signal generating means) 68, track area judging circuit (track area judging means) 69, and a memory (storage means) 70.

Upon receipt of the first wobble signal from the recording/reproducing section 4, the physical address detecting circuit 64 extracts the rotation synchronizing signal from the first wobble signal and outputs the same to the servo circuit 7, and extracts the physical address signal and outputs the same to the address decoder 5. The servo circuit 7 controls the number of rotations of the optical disk 10 based on the rotation synchronizing signal.

Upon receipt of the second wobble signal from the recording/reproducing section 4, the physical address detecting circuit 67 extracts the rotation synchronizing signal from the second wobble signal and outputs the same to the servo circuit 7, and extracts the physical address and outputs the same to the address decoder 5. The servo circuit 7 controls the number of rotations of the optical disk 10 based on the rotation synchronizing signal.

The phase comparing circuit 68 constitutes wobbling polarity judging signal generating means which generates the wobbling polarity judging signal used in conducting the wobbling polarity judgment by comparing the phases of the first and second wobble signals inputted from the recording/reproducing section 4 and outputs the same to the system controller 3 serving as recording/reproducing control means and the track area judging circuit 69 serving as track area judging means. The wobbling polarity judgment by the phase comparing circuit 68 will be explained in detail below.

The track area judging circuit 69 is connected to the memory 70 serving as storage means having stored a correspondence of the wobbling polarity to the track area. The memory 70 is a memory from which the correspondence can be read out and into which the correspondence can be written. Detailed explanations of how the correspondence of the wobbling polarity to the track area is set will be given below.

The track area judging circuit 69 computes the track area judging signal based on the correspondence of the wobbling polarity to the track area stored in the memory 70, and outputs the same to the address decoder 5.

The address decoder 5 computes a logical address signal unique to the track from the track area judging signal and physical address signal from the wobble signal processing circuit 9 and manages the addressees.

As shown in FIG. 1, the wobble signal processing circuit 9 generates the rotation synchronizing signal and physical address signal from both the first and second signals. However, the generating method is not limited to the foregoing, and the rotation synchronizing signal and physical address signal may be generated from one of the first and second wobble signals. In this case, either the physical address detecting circuit 64 or 67 can be omitted, thereby downsizing the circuit as a whole.

Next, the following will explain in detail the recording/reproducing section 4.

Figure 3:
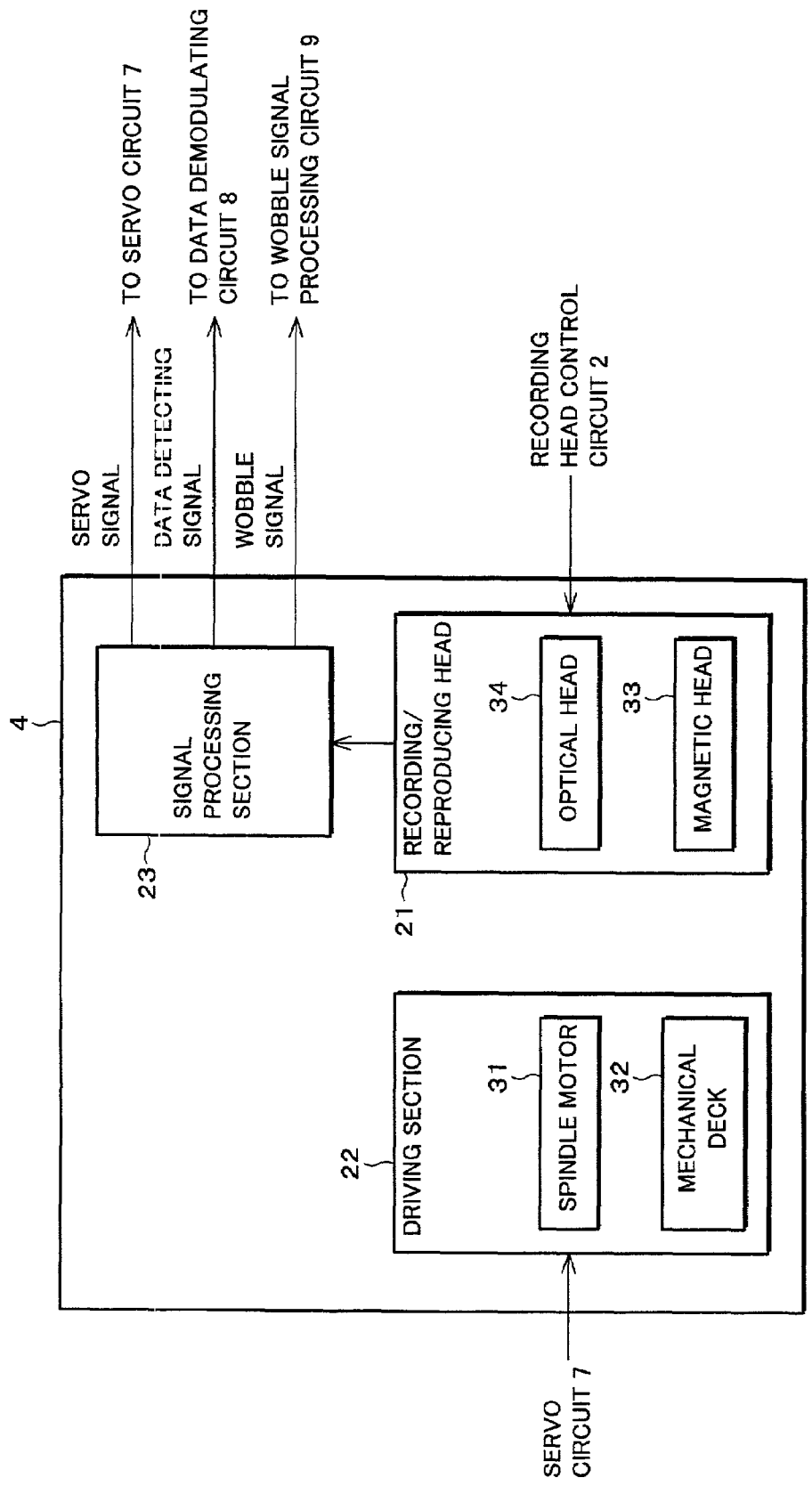
FIG. 3 is a view schematically showing an arrangement of a recording/reproducing section provided in the recording and reproducing apparatus of FIG. 2.

As shown in FIG. 3, the recording/reproducing section 4 includes the recording/reproducing head 21, a driving section 22, and a signal processing section 23.

The recording/reproducing head 21 is composed of an optical head 34 and a magnetic head 33, and its operation is controlled by a control signal from the recording head control circuit 2.

In other words, the magnetic head 33 and optical head 34 operate in response to the control signal supplied from the recording head control circuit 2, and respectively generate a magnetic field and a laser beam when recording specific data (codes from the data modulating circuit 1) into the optical disk 10. The recording method adopted herein is a method, by which the optical head 34 emits a pulse in sync with a recording clock while the magnetic field of the magnetic head 33 is modulated.

The optical head 34 emits a laser beam onto the optical disk 10, receives reflection light, and outputs an electrical signal in response to a quantity of the received light to the signal processing section 23. The signal processing section 23 generates the servo signal (tracking error signal, focus error signal), data detecting signal, and wobble signal from the input electrical signal, and outputs the servo signal to the servo circuit 7, and the data detecting signal and wobble signal to the data demodulating circuit 8 and wobble signal processing circuit 9, respectively. The signal processing by the signal processing section 23 will be explained in detail below.

In addition, the driving section 22 includes a spindle motor 31 which turns the optical disk 10 and a mechanical deck 32 for moving the recording/reproducing head 21, and operates in response to the control signal supplied from the servo circuit 7.

Figure 4:
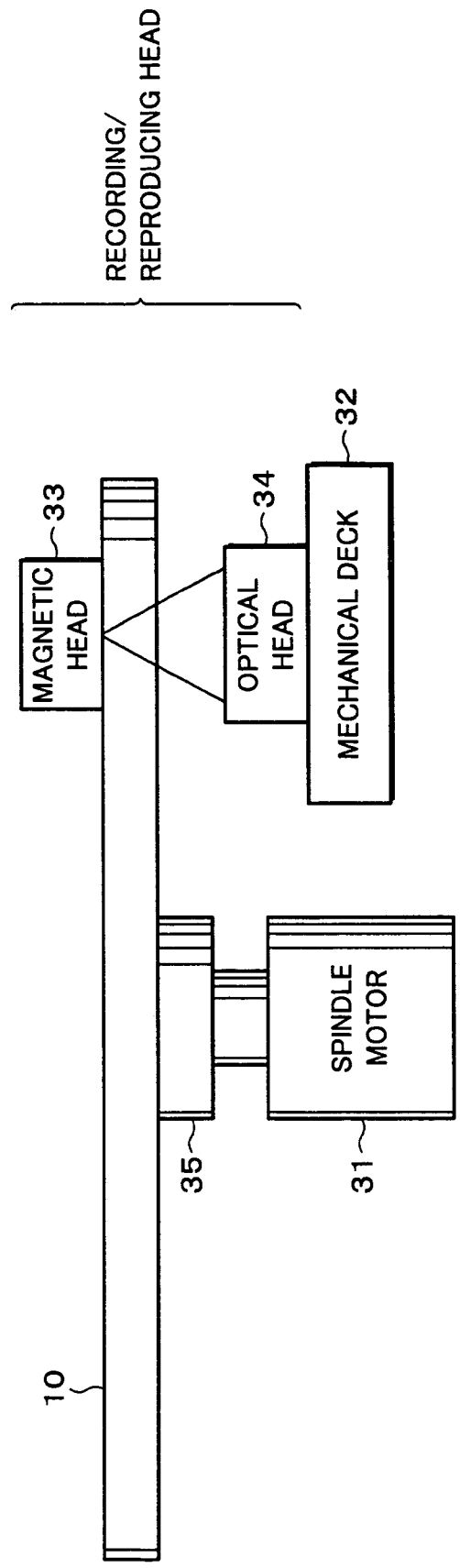
FIG. 4 is a view schematically showing an arrangement of an example driving section provided in the recording/reproducing section of FIG. 3.

To be more specific, as shown in FIG. 4, a turn table 35 is provided on the top of the spindle motor 31, and the optical disk 10 placed on the turn table 35 is turned while the recording/reproducing head 21 (magnetic head 33 and optical head 34) provided above the mechanical deck 32 is moved along the radius direction of the optical disk 10 in accordance with the control signal from the servo circuit 7. The magnetic head 33 is placed so as to oppose the optical head 34 through the optical disk 10.

Although it is not illustrated, driving mechanism is additionally provided, and this driving mechanism approximates the magnetic head 33 to the optical disk 10 when recording information and removes the magnetic head 33 from the optical disk 10 when reproducing information in accordance with the control signal from the system controller 3. This arrangement can eliminate problems such that dusts entered in a space between the magnetic head 33 and optical disk 10 while reproducing information cause a flaw on the optical disk 10 or the focus servo is disturbed when vibrations of the magnetic head 33 is conveyed while reproducing information.

The following will explain a more specific arrangement of the recording/reproducing head 21.

Figure 5:
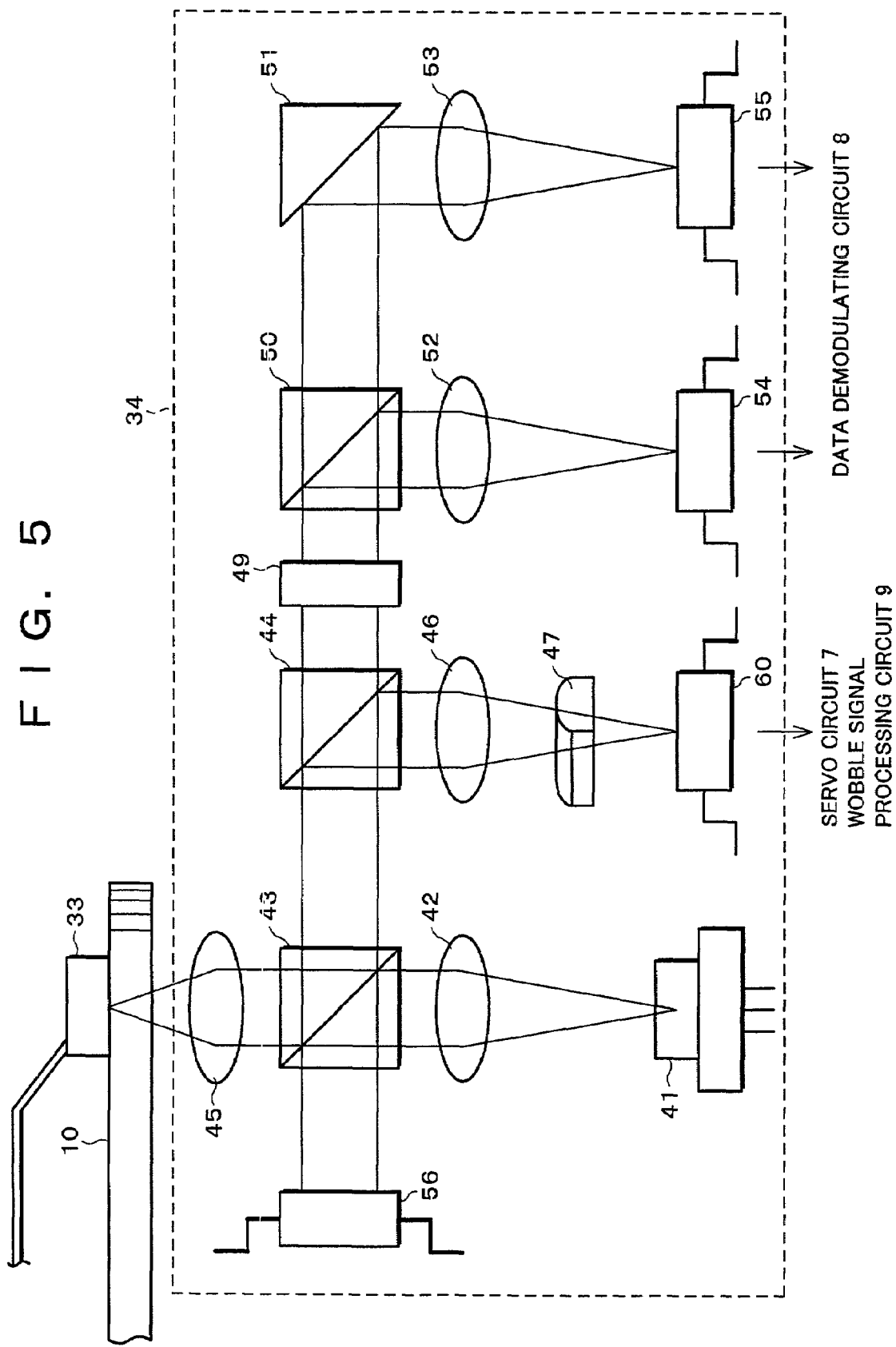
FIG. 5 is a view schematically showing an arrangement of an example optical head provided in the recording/reproducing section of FIG. 3.

For example, as shown in FIG. 5, the optical head 34 includes one semiconductor laser 41. A laser beam emitted from the semiconductor laser 41 is converged to a specific area on a recording layer of the optical disk 10 by way of a collimator lens 42, a beam splitter 43, and an objective lens 45.

Reflection light from the optical disk 10 goes into the beam splitter 43 by way of the objective lens 45, and a part of a polarized light component p (for example, 30% of the p polarized light component), and all of a polarized light component s are reflected to reach the beam splitter 44.

The beam splitter 44 delivers a part of the incident laser beam to a lens 46, and most of the rest to a polarized light beam splitter 50 by way of a half-wave plate 49.

The polarized light beam splitter 50 separates the incident laser beam into the polarized light component s and polarized light component p, and delivers the former to a lens 52 and the latter to a lens 53 by way of a mirror 51.

On the other hand, the laser beam that comes out from the beam splitter 44 and goes into the lens 46 is given with astigmatism from a cylindrical lens 47 and reaches the photo-detector 60. Then, the laser beam is converted into an electrical signal corresponding to the intensity of the beam, and outputted to the servo circuit 7 by way of the signal processing section 23 (FIG. 3) as the servo signal (focus error signal, tracking error signal).

The photo-detector 60 outputs the electrical signal corresponding to the intensity of the beam to the wobble signal processing circuit 9 by way of the signal processing section 23 (FIG. 3) as the wobble signal.

In addition, the laser beam coming out from the polarized light beam splitter 50 goes into the photo-detector 54 by way of the lens 52, and the photo-detector 55 by way of the mirror 51 and lens 53. The electrical signals outputted from the photo-detectors 54 and 55 are amplified differentially, and outputted to the data demodulating circuit 8 by way of the signal processing section 23 (FIG. 3) as the data detecting signal.

Returned light used in data detection changes its polarization state in response to data recorded in the optical disk 10. Thus, data can be detected by a difference in polarized light components of received light by the photo-detectors 54 and 55.

The beam splitter 43 separates the incident laser beam into the foregoing laser beam heading to the optical disk 10 and a laser beam heading to the photo-detector 56. By detecting a quantity of the latter laser beam by the photo-detector 56, a light output control (APC) of the semiconductor laser 41 can be conducted.

Next, the signal processing by the signal processing section 23 in the recording/reproducing section 4 will be explained with reference to FIG. 6.

As shown in FIG. 6, the signal processing section 23 includes an operational circuit 71 which processes the electrical signals from the photo-detectors 54, 55, and 60 in a specific manner and generates the servo signal, data detecting signal, and wobble signal, which are respectively outputted to the servo circuit 7, data demodulating circuit 8, and wobble signal processing circuit 9.

As shown in FIG. 1, the photo-detector 60 is divided into two light receiving sections 60A and 60B by the dividing line 61a along the track direction of the optical disk 10. Further, as shown in FIG. 6, in the photo-detector 60, the light receiving section 60A is sub-divided into light receiving sections B and C and the light receiving section 60B is sub-divided into light receiving sections A and D by a dividing line 61b along a direction perpendicular to the track of the optical disk 10.

In addition, the photo-detectors 54 and 55 include light receiving sections E and F, respectively.

Hence, the photo-detector 60 includes four light receiving sections A–D in total, and supplies output signals SA–SD corresponding to a quantity of incident light obtained from the light receiving sections A–D to the operational circuit 71. The photo-detectors 54 and 55 output signals SE and SF in response to quantities of incident light from the receiving sections E and F, respectively and supply the same to the operational circuit 71.

The operational circuit 71 generates the data detecting signals (SE–SF) from the supplied output signals SE and SF, and outputs the same to the data demodulating circuit 8.

The operational circuit 71 uses the supplied output signals SA-SD and generates the focus error signal ((SA+SC)–(SB+SD)), tracking error signal ((SA+SD)–(SB+SC)), and total signal ((SA+SD)+(SB+SC)).

Then, the operational circuit 71 outputs the focus error signal ((SA+SC)–(SB+SD)) and the tracking error signal ((SA+SD)–(SB+SC)) to the servo circuit 7 as the servo signal.

Further, the operational circuit 71 outputs the tracking error signal ((SA+SD)–(SB+SC)) and total signal ((SA+SD)+(SB+SC)) to the wobble signal processing circuit 9 as the first wobble signal and second wobble signal, respectively.

The following will explain a wobble signal detected from reflection light from the optical disk 10 by the foregoing recording and reproducing apparatus with reference to FIG. 5 and FIGS. 7(a) through 7(e).

Figure 7A:
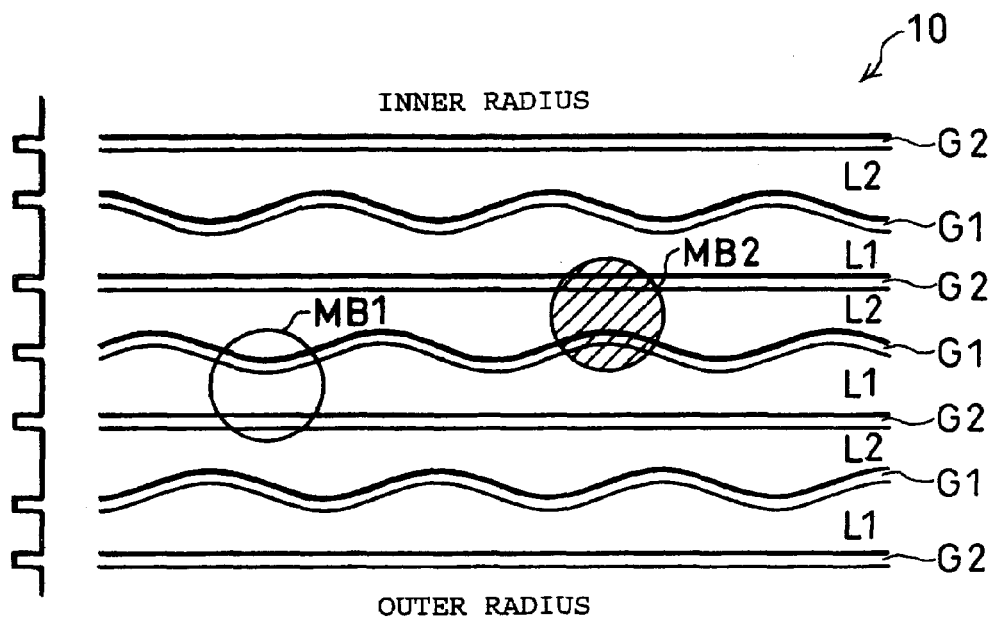
FIGS. 7(a) through 7(e) are views showing an example of a principle in judging a wobbling polarity by the recording and reproducing apparatus of the present invention.

A laser beam coming out from the objective lens 45 (FIG. 5) can take two states as shown in FIG. 7(a), for example: when irradiated to the center of the first track area (land L1)

as a light spot MB1 (open circle), and when irradiated to the center of the second track area (land L2) as a light spot MB2 (circle with diagonal lines).

Figure 7B:
Figure 7C:

When the light spot MB1 moves forward in the first track area, an output signal waveform of the first wobble signal detected from the difference signal (tracking error signal) is the one shown in FIG. 7(b) if matched to the spot position on the track, and an output signal waveform of the second wobble signal detected from the sum signal (total signal) is the one shown in FIG. 7(c) if matched to the spot position on the track.

The wobbling frequency of the wobbling groove G1 formed on the optical disk 10 is set to a frequency (for example, 50 kHz), which is higher than the follow-up frequency of the tracking servo, and lower than a data recording frequency. Thus, the light spot MB1 moves forward in the track at the average center.

However, the actual center of the track changes in response to the wobbling, and a tracking error occurs inevitably. In other words, a positive or negative error occurs depending on whether the light spot MB1 is at the inner or outer radius of the actual center of the track. The first wobble signal is detected by the tracing error signal generated at this point. In addition, because the track width changes in response to the shape of the wobbling groove G1, the total signal changes in response to a change in the track width. The second wobble signal is detected by the total signal generated at this point.

Figure 7D:
Figure 7E:

When the light spot MB2 moves forward in the second track area, an output signal waveform of the first wobble signal detected from the difference signal (tracking error signal) is the one shown in FIG. 7(d) if matched to the spot position on the track, and an output signal waveform of the second wobble signal detected from the sum signal (total signal) is the one shown in FIG. 7(e) if matched to the spot position on the track.

In the same manner as the foregoing explanation, the first wobble signal is detected by the tracking error signal, and the second wobble signal is detected by a change in the total signal.

Next, the following will explain a case where the light spots MB1 and MB2 move forward in the lands L1 and L2 adjacent to the common wobbling groove G1 with reference to FIGS. 7(a) through 7(e).

When a laser beam moves forward as shown by the light spot MB1 in the first track area (land L1), the first and second wobble signals are in phase. On the other hand, when a laser beam moves forward as shown by the light spot MB2 in the second track area (land L2), the first and second wobble signals are anti-phase.

Thus, by comparing the phases of the first and second wobble signals, whether the wobbled side wall is at the inner or outer radius of the track can be judged (wobbling polarity judgment can be conducted). In other words, whether the track onto which a light spot is irradiated is the land L1 or L2 adjacent to the common wobbling groove G1 can be judged (track area judgment can be conducted).

Here, the principle of the foregoing track area judgment will be explained. In the following explanation, the first and second wobble signals at the point of the light spot MB1 shown in FIG. 7(a) will be discussed.

To begin with, the first wobble signal will be discussed.

A small track width is given to the land L1, and the actual center of the track shifts to the lower side (outer radius) of the average center of the track. On the other hand, a wider track width is given to the land L2, but the actual center of the track also shifts to the lower side (outer radius) of the average center of the track.

Thus, the first wobble signal detected from the tracking error signal is a signal having the same polarity in both the lands L1 and L2.

Next, the second wobble signal will be discussed.

A smaller track width is given to the land L1 and the total signal becomes smaller accordingly. On the other hand, a wider track width is given to the land L2 and the total signal becomes larger accordingly.

Thus, the second wobble signal detected from the total signal is a signal having the opposite polarities in the lands L1 and L2.

Thus, when the polarities of the first and second wobble signals are compared with each other, the phases invert in the lands L1 and L2.

The following will explain a method of setting a correspondence of the wobbling polarity to the track area stored in the memory 70 provided in the wobble signal processing circuit 9.

When the output from the phase comparing circuit 68 provided in the wobble signal processing circuit 9 shows the in phase state, whether a track in question is the first track area (land L1) or the second track area (land L2) is analyzed using a reference disk with which the correspondence has been already established, and the analysis result is stored in the memory 70.

By using the memory 70 in this manner, labors involving the replacement of wiring or changing the switch setting can be omitted. Further, the setting of the correspondence of the wobbling polarity to the track area can be corrected by automatic adjustment when the optical disk 10 is installed to the recording and reproducing apparatus.

If a nonvolatile memory is used as the memory 70, the automatic correction is effected only once before the recording and reproducing apparatus is delivered.

Further, even when the number of the inverting amplifiers is changed due to a change in design and a signal from only one wobble signal detecting circuit inverts, or the output signal polarity inverts due to a change in the specs of the photo-detector, the setting of the correspondence of the wobbling polarity to the track area can be corrected by the automatic adjustment.

However, the polarity of a push-pull signal, such as the tracking error signal, inverts at $\lambda/4$ given as the depth of the grooves in the recording medium, where $\lambda$ is a wavelength of the semiconductor laser 41. In other words, the polarity inverts depending on whether the depth is smaller $(0-\lambda/4)$ or greater $(\lambda/4-\lambda/2)$ than $\lambda/4$. In addition, a refractive index of the substrate of the recording medium should be also concerned as the actual depth of the groove.

On the other hand, the total signal maintains a relation that a signal from an area given with a larger width is always greater than a signal from an area given with a smaller width.

Thus, the phase relation between the first wobble signal detected from the push-pull signal and the second wobble signal detected from the total signal depends on the depth of the groove of a used recording medium.

Consequently, the foregoing signal polarity inversion causes a problem when information is reproduced from the optical disk 10 designed for use at a different wavelength. For example, when information is reproduced by the optical head 34 using the semiconductor laser 41 having a wavelength of $\lambda=650$ nm from a recording medium provided with grooves having a depth of 70 nm formed on its polycarbonate (PC) substrate, given 1.58 as the refractive index of the PC substrate at the wavelength of λ=650 nm, then the depth of the groove in the recording medium is smaller than λ/4.

On the other hand, when information is reproduced from the foregoing recording medium by the optical head 34 using the semiconductor laser 41 having a wavelength of λ=400 nm, given 1.62 as a refractive index of the PC substrate at a wavelength of λ=400 nm, then the depth of the groove converted to a wavelength is (70×1.62)/400=1/3.5-λ/3.5, in short, greater than λ/4.

Hence, with the optical head 34 using the semiconductor laser 41 having a wavelength of λ=400 nm, information should be recorded/reproduced into/from a recording medium designed for use at a wavelength of λ=400 nm with the depth of groove of approximately λ/6, and a recording medium designed for use at a wavelength of λ=650 nm with the depth of groove of approximately λ/3.5.

Figure 8:
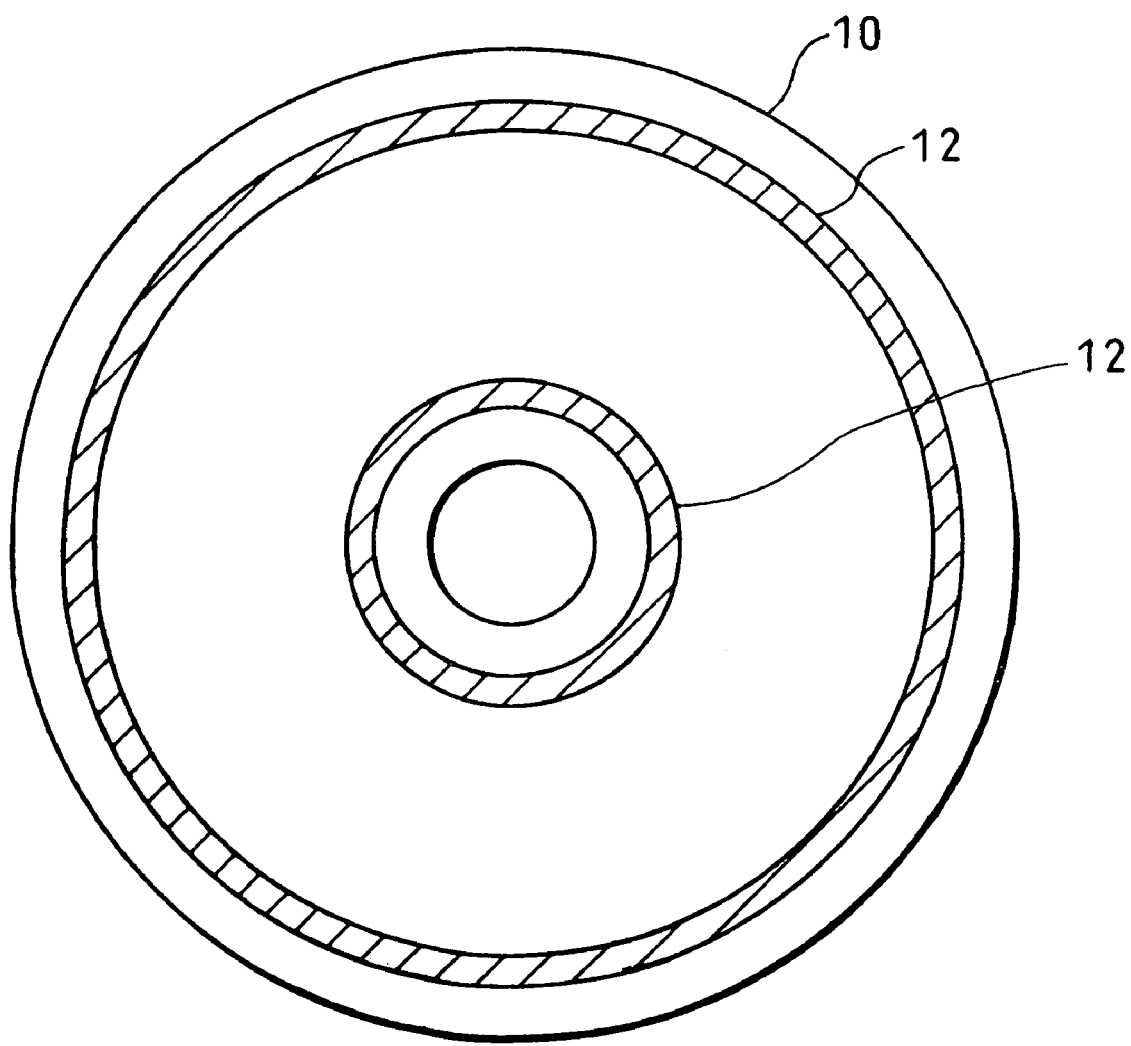
FIG. 8 is a view schematically showing an example recording medium of the present invention.
Figure 9A:
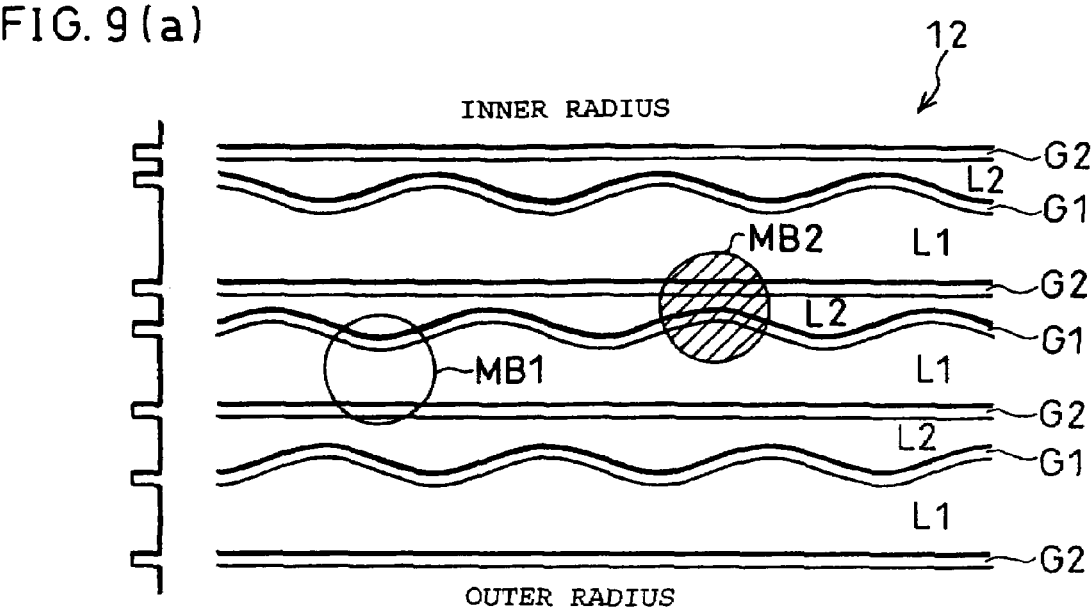
FIGS. 9(a) through 9(e) are views explaining an example of a principle in judging a wobbling polarity by the recording and reproducing apparatus employing the recording medium of FIG. 8.
Figure 9B:
Figure 9C:
Figure 9D:
Figure 9E:
Figure 10A:
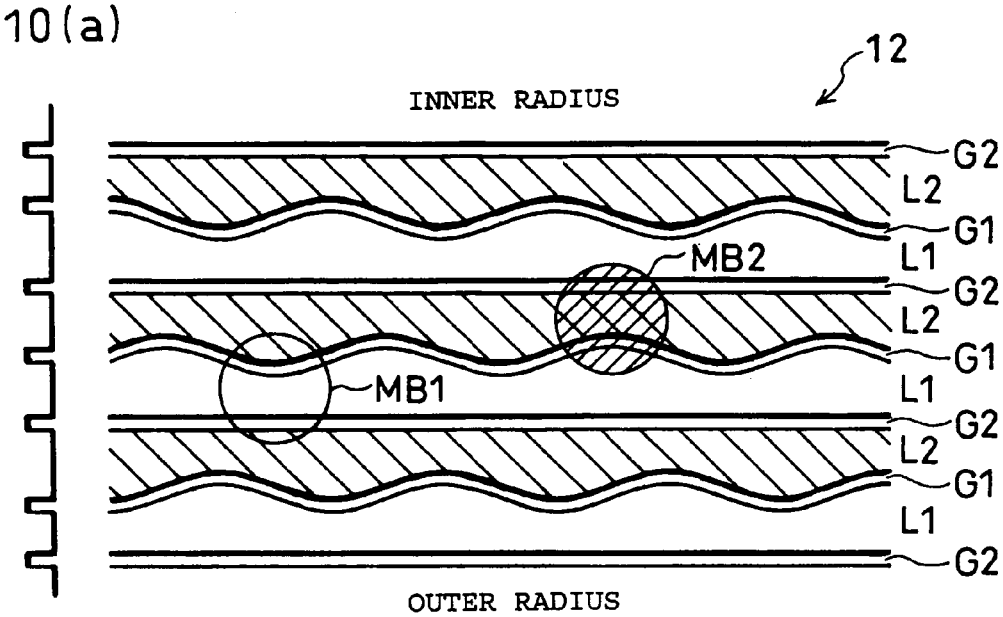
FIGS. 10(a) through 10(e) are views explaining another example of the principle in judging a wobbling polarity by the recording and reproducing apparatus employing the recording medium of FIG. 8.
Figure 10B:
Figure 10C:
Figure 10D:
Figure 10E:

As shown in FIG. 8, the above inconvenience can be eliminated by providing adjusting areas 12 at the innermost and outermost areas of the optical disk 10, so that the first and second track areas are distinguished from each other by using physical properties independent of the depth of the groove.

Then, the first and second track areas are distinguished from each other with the adjusting areas 12 by using the physical properties at the start-up, and a correspondence of the wobbling polarity (phase relation between the first and second wobble signals) to the track area is found from the distinguishing (judging) result, and the correspondence thus found is stored into the memory 70. Consequently, even if the depth of the groove is greater or smaller than λ/4, the correspondence can be set adequately by the adjusting areas 12 formed on the optical disk 10. The correspondence of the physical properties to the track area is stored into a ROM section of the system controller 3 and read out as necessary.

The following will explain the distinguishing (judging) operation of the track area by using the foregoing adjusting areas 12 on the optical disk 10 more specifically with reference to FIGS. 9 and 10.

An explanation of a first example will be given.

In the first example, as shown in FIG. 9(*a*), a wider width is given to the first track area (land L1) compared with the second track area (land L2) in the adjusting areas 12. In FIG. 9(*a*), a laser beam coming out from the objective lens 45 shows two states: when converged as a light spot MB1 (open circle) at the center of the first track area (land L1), and when converged as a light spot MB2 (circle with diagonal lines) at the center of the second track area (land L2).

When the light spot MB1 moves forward in the first track area, an output signal waveform of the first wobble signal detected from the difference signal (tracking error signal) is the one shown in FIG. 9(*b*) if matched to the spot position on the track, and an output signal waveform of the second wobble signal detected from the sum signal (total signal) is the one shown in FIG. 9(*c*) if matched to the spot position on the track.

When the light spot MB2 moves forward in the second track area, an output signal waveform of the first wobble signal detected from the difference signal (tracking error signal) is the one shown in FIG. 9(*d*) if matched to the spot position on the track, and an output signal waveform of the second wobble signal detected from the sum signal (total signal) is the one shown in FIG. 9(*e*) if matched to the spot position on the track.

The following will explain a case when the light spots MB1 and MB2 move forward in the lands L1 and L2 both adjacent to the common wobbling groove G1 with reference to FIGS. 9(*a*) through 9(*e*).

When a laser beam moves forward as the light spot MB1 in the first track area (land L1), the first and second wobble signals are in phase, whereas when a laser beam moves forward as the light spot MB2 in the second track area (land L2), the first and second wobble signals are anti-phase.

Further, the amplitude of the wobble signal is greater in the first track area than that in the second track area. In other words, a correspondence of the track area to the phase relation can be set from the amplitude of the wobble signal and phase comparison between the first and second wobble signals.

Not only the wobble signal, but also the total signal changes in the first and second track areas. In other words, the total signal becomes larger in the first track area given with a greater width. Thus, the correspondence of the track area to the phase relation can be also set by comparing the levels of the total signals, and phases of the first and second wobble signals.

Next, a second example will be explained.

In the second example, as shown in FIG. 10(*a*), a higher reflection factor is given to the first track area (land L1) compared with the second track area (land L2) in the adjusting areas 12. In FIG. 10(*a*), a laser beam coming out from the objective lens 45 is shown in two states: when converged as a light spot MB1 (open circle) at the center of the first track area (land L1) and when converged as a light spot MB2 (circle with diagonal lines) at the center of the second track area (land L2).

When the light spot MB1 moves forward in the first track area, an output signal waveform of the first wobble signal detected from the difference signal (tracking error signal) is the one shown in FIG. 10(*b*) if matched to the spot position on the track, and an output signal waveform of the second wobble signal detected from the sum signal (total signal) is the one shown in FIG. 10(*c*) if matched to the spot position on the track.

When the light spot MB2 moves forward in the second track area, an output signal waveform of the first wobble signal detected from the difference signal (tracking error signal) is the one shown in FIG. 10(*d*) if matched to the spot position on the track, and an output signal waveform of the second wobble signal detected from the sum signal (total signal) is the one shown in FIG. 10(*e*) if matched to the spot position on the track.

The following will explain a case where the light spots MB1 and MB2 move forward in the lands L1 and L2 both adjacent to the common wobbling groove G1 with reference to FIGS. 10(*a*)–10(*e*).

When a laser beam moves forward in the first track area (land L1) as shown by the spot MB1, the first and second wobble signals are in phase, while when a laser beam moves forward in the second track area (land L2) as shown by the light spot MB2, the first and second wobble signals are anti-phase.

Further, because a higher reflection factor is given to the first track area (land L1) compared with the second track area (land L2), the wobble signal obtained from the first track area has a wider amplitude than the one obtained from the second track area. In other words, by comparing the amplitudes of the wobble signals and the phases of the first and second wobble signals, a correspondence of the track area to the phase relation can be set.

Not only the wobble signal, but also the total signal changes in the first and second track areas. In other words, the total signal becomes larger in the first track area given with a higher reflection factor. Thus, by comparing the levels of the total signals, and the phases of the first and second wobbles signals, the correspondence of the track area to the phase relation can be also set.

Although it is not shown in the drawing, the adjusting areas 12 may be arranged in the following manner. That is, data is recorded only the first track area (land L1), so that an area from which a data detection signal is obtained is judged as the first track area. In order to ensure the reliability of this judgment, a recording film is formed on the first track area (land L1) alone, so that no signal can be recorded into the second track area.

The foregoing recording and reproducing apparatus can judge precisely whether a track being tracked is the track at the inner or outer radius of the groove where the address information is recorded by using one laser beam.

In the present embodiment, the astigmatism method is adopted for the focus servo and the push-pull method is adopted for the tracking servo. However, it should be appreciated that the other servo methods are also applicable. In other words, even when the 3-beam method or DPP method is adopted for the tracking servo, the subject of the present invention is not deviated if the track area is judged by using the main beam. If the 3-beam method or DPP method is adopted for the tracking servo, the occurrence of a tracking offset caused by a shift of the objective lens or a tilt of the optical disk can be suppressed compared with the push-pull method.

In addition, the foregoing explained a case where the optical disk is provided with wobbling grooves and DC grooves, and a signal is recorded/reproduced into/from the lands. However, it should be appreciated that the present invention is applicable to an optical disk in which a signal is recorded/reproduced into/from grooves composed of wobbled lands and non-wobbled lands.

As has been discussed, a recording and reproducing apparatus of the present invention is arranged so as to include:

a photo-detector, having at least two light receiving sections divided along a track direction, for receiving reflection light from a track by each of said two light receiving sections;

first wobble signal detecting means for detecting a first wobble signal from a difference signal of outputs from the two light receiving sections in said photo-detecting means;

second wobble signal detecting means for detecting a second wobble signal from a sum signal of the outputs from the two light receiving sections in said photo-detecting means; and wobbling polarity judging signal generating means for generating a wobbling polarity judging signal used in judging a wobbling polarity of a track being tracked by comparing phases of the first and second wobble signals detected.

Accordingly, the wobbling polarity judging signal generating means generates the wobbling polarity judging signal used in judging the wobbling polarity of a track being tracked by comparing the phases of the first and second wobble signals detected separately from reflection light from the track. Thus, the wobbling polarity of the track being tracked can be judged accurately in real time by using one laser beam.

Hence, by providing track area judging means for judging whether a track area being tracked is a first track area or a second track area in accordance with the wobbling polarity judging signal generated by the wobbling polarity judging signal generating means, the track area can be judged in real time as an effect.

Because the track area is judged in real time based on the wobbling polarity, even if an unwanted track jump occurs in a recording medium in which common address information is wobbled in the first and second track areas, a signal can be recorded/reproduced into/from a track area which has been controlled right before the track jump occurred as an effect.

Consequently, even if an unwanted track jump occurs, the track area can be judged instantaneously without requiring a processing time for address computation or the like. Moreover, a signal can be recorded into a recording medium without breaking recorded data and data can be reproduced continuously when reproducing recorded signals from the recording medium as an effect.

Further, the recording and reproducing apparatus may be additionally provided with storage means for storing a correspondence of the wobbling polarity to the track area used as a track judging reference by the track area judging means.

In this case, by storing into the storage means a correspondence of the wobbling polarity to the track area used as the track judging reference by the track area judging means, more specifically, a correspondence of the wobbling polarity to the track area analyzed by using a pre-adjusted reference recording medium, the track area can be judged based on the pre-stored correspondence of the wobbling polarity to the track area even when there is a difference between the recording and reproducing apparatuses or the polarity of the first or second wobble signal is not identical.

Thus, replacement of wiring or changing of the switch setting in the recording and reproducing apparatus is not necessary to make the polarity of the first or second wobble signal identical, thereby saving the manufacturing costs of the recording and reproducing apparatus as an effect.

Further, the recording and reproducing apparatus may further include recording/reproducing control means for directing to suspend information recording/reproducing, if the wobbling polarity judging signal generated by the wobbling polarity judging signal generating means is a signal that shows irregular inversion of the wobbling polarity for an intended track jump.

By providing the recording/reproducing control means for directing to suspend information recording/reproducing if the wobbling polarity judging signal is a signal that shows irregular inversion of the wobbling polarity for an intended track jump, that is, a signal showing an abnormal wobbling polarity inversion, even if an unwanted track jump can not be detected, the recording can be suspended immediately while information is recorded to minimize damages to the recorded data, and the reproducing can be suspended immediately while information is reproduced, thereby shortening the reproduction processing time.

In order to solve the above problems, a recording medium of the present invention is arranged in such a manner that an adjusting area indicating a correspondence of the wobbling polarity to the track area is formed thereon.

Thus, the correspondence can be initialized for each recording medium and by setting a correspondence of the wobbling polarity to the track area for each recording medium, a respective correspondence can be set to each of the recording media of two kinds having opposite phase relation between the first and second wobble signals having different depths of the grooves. Thus, the limitation of the depth of the groove in a used recording medium can be removed, thereby increasing manufacturing flexibility of the recording medium as an effect.

In addition, different widths may be given to the first track area and second track area in the adjusting area.

In this case, by comparing physical properties (amplitude of the wobble signal, a level of the total signal, etc.) in the first and second track areas, the track area can be judged precisely as an effect.

Further, in case that the recording medium is a disk, the adjusting area may be provided in at least one of the innermost and outermost areas of the disk.

By forming the adjusting area in the vicinity of a recording start position, a correspondence of the wobbling polarity to the track area can be set at the start-up of the recording medium, that is, when the recording medium starts to turn. Consequently, as an effect, the start-up takes a shorter time compared with a case when setting a correspondence of the wobbling polarity to the track area in an actual recording area of the recording medium.

In addition, when the adjusting areas are provided at the innermost and outermost areas of the disk of the recording medium, the correspondence of the wobbling polarity to the track area can be confirmed in two areas, thereby making it possible to set a reliable correspondence as an effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording medium provided with first and second track areas formed as adjacent first and second lands that each have a wobble wall spaced from one another by a groove that is not itself a track area, said first and second lands each also having a non-wobbled side wall opposite said wobbled side wall of the associated one of said first and second lands, wherein said first and second track areas provide an adjusting area to show correspondence of a wobbling polarity to said first and second track areas.

2. The recording medium of claim 1, wherein different widths are given to the first track area and second track area in said adjusting area so that the overall width of one of said first and second track areas is always different from the overall width of the other of said first and second track areas despite variations due to said wobbling.

3. The recording medium of claim 1, wherein, in case that the recording medium is a disk, said adjusting area is provided in at least one of innermost and outermost areas of said disk.

4. A recording medium provided with first and second track areas formed as adjacent first and second grooves that each have a wobble wall spaced from one another by a land that is not itself a track area, said first and second grooves each also having a non-wobble side wall opposite said wobbled side wall of the associated one of said first and second grooves, wherein said first and second track areas provide an adjusting area to show correspondence of a wobbling polarity to said first and second track areas.

5. The recording medium of claim 4, wherein different widths are given to the first track area and second track area in said adjusting area so that the overall width of one of said first and second track areas is always different from the overall width of the other of said first and second track areas despite variations due to said wobbling.

6. The recording medium of 4, wherein, in case that the recording medium is a disk, said adjusting area is provided in at least one of innermost and outermost areas of said disk.

* * * * *